United States Patent
Aldrich, III et al.

(10) Patent No.: US 6,529,805 B2
(45) Date of Patent: *Mar. 4, 2003

(54) METHODS AND APPARATUS FOR CONFIGURING AN AUTOMOBILE ELECTRONIC CONTROL MODULE

(75) Inventors: William Leonard Aldrich, III, Davisburg, MI (US); David P. Tasky, Farmington Hills, MI (US)

(73) Assignee: General Motors Corporation, Detroit, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/789,310

(22) Filed: Feb. 21, 2001

(65) Prior Publication Data

US 2002/0116093 A1 Aug. 22, 2002

(51) Int. Cl.⁷ .............................................. G06F 17/00
(52) U.S. Cl. ............................................ 701/1; 701/36
(58) Field of Search ................................ 701/1, 24, 29, 701/33, 34, 35, 36

(56) References Cited

U.S. PATENT DOCUMENTS

| | | | |
|---|---|---|---|
| 5,012,415 A | * | 4/1991 | Boe et al. .................... 172/3 |
| 5,472,056 A | * | 12/1995 | Orbach ........................ 172/2 |
| 5,547,434 A | * | 8/1996 | Graf et al. .................. 477/109 |
| 5,775,406 A | * | 7/1998 | Ghitea, Jr. ................. 165/11.1 |
| 5,893,044 A | * | 4/1999 | King et al. ............. 342/357.12 |
| 5,918,195 A | * | 6/1999 | Halgrimson et al. ........ 318/624 |
| 5,971,116 A | * | 10/1999 | Franklin .................. 188/266.2 |
| 6,026,340 A | * | 2/2000 | Corrado et al. ............. 280/735 |
| 6,073,736 A | * | 6/2000 | Franklin .................. 137/625.3 |
| 6,246,953 B1 | * | 6/2001 | Quinn et al. ........... 123/406.34 |
| 6,272,411 B1 | * | 8/2001 | Corrado et al. ............. 180/271 |

* cited by examiner

Primary Examiner—William A. Cuchlinski, Jr.
Assistant Examiner—Olga Hernandez
(74) Attorney, Agent, or Firm—Christopher DeVries

(57) ABSTRACT

Method and apparatus are provided for configuring an automobile electronic control module (ECM) for multiple automobile configurations. The apparatus includes a vehicle identifier identifying one of the multiple automobile configurations and a memory configured to store multiple calibration data sets, with each of the multiple calibration sets corresponding to one of the multiple automobile configurations. The apparatus also includes a processor configured to receive the vehicle identifier and select one of multiple calibration data sets based at least in part upon the vehicle identifier for execution of automobile functions controlled by the automobile ECM.

9 Claims, 4 Drawing Sheets

CALIBRATION SET

| BASE SPARK ANGLE f(ENGINE SPEED) ||
|---|---|
| ENGINE SPEED | BASE SPARK ANGLE |
| 0 RPM | 0 DEGREES |
| 500 RPM | +5 DEGREES |
| 1000 RPM | +10 DEGREES |
| 1500 RPM | +11 DEGREES |
| 2000 RPM | +12 DEGREES |
| 2500 RPM | +13 DEGREES |
| 3000 RPM | +14 DEGREES |
| 3500 RPM | +15 DEGREES |
| 4000 RPM | +16 DEGREES |
| 4500 RPM | +18 DEGREES |
| 5000 RPM | +18 DEGREES |
| 5500 RPM | +20 DEGREES |

| TEMPERATURE SPARK ANGLE OFFSET f(ENGINE TEMP) ||
|---|---|
| ENGINE TEMPERATURE | TEMPERATURE SPARK ANGLE OFFSET |
| -40 DEGREES C | +7 DEGREES |
| -20 DEGREES C | +5 DEGREES |
| 0 DEGREES C | +4 DEGREES |
| 20 DEGREES C | +3 DEGREES |
| 40 DEGREES C | +2 DEGREES |
| 60 DEGREES C | 0 DEGREES |
| 80 DEGREES C | 0 DEGREES |
| 100 DEGREES C | -2 DEGREES |
| 120 DEGREES C | -2 DEGREES |
| 150 DEGREES C | -5 DEGREES |

| THROTTLE SPARK ANGLE OFFSET f(THROTTLE POSITION) ||
|---|---|
| THROTTLE POSITION | THROTTLE SPARK ANGLE OFFSET |
| 0% | 0 DEGREES |
| 10% | 0 DEGREES |
| 20% | 0 DEGREES |
| 30% | 0 DEGREES |
| 40% | 0 DEGREES |
| 50% | -1 DEGREES |
| 60% | -2 DEGREES |
| 70% | -3 DEGREES |
| 80% | -5 DEGREES |
| 90% | -7 DEGREES |
| 100% | -9 DEGREES |

Fig-2

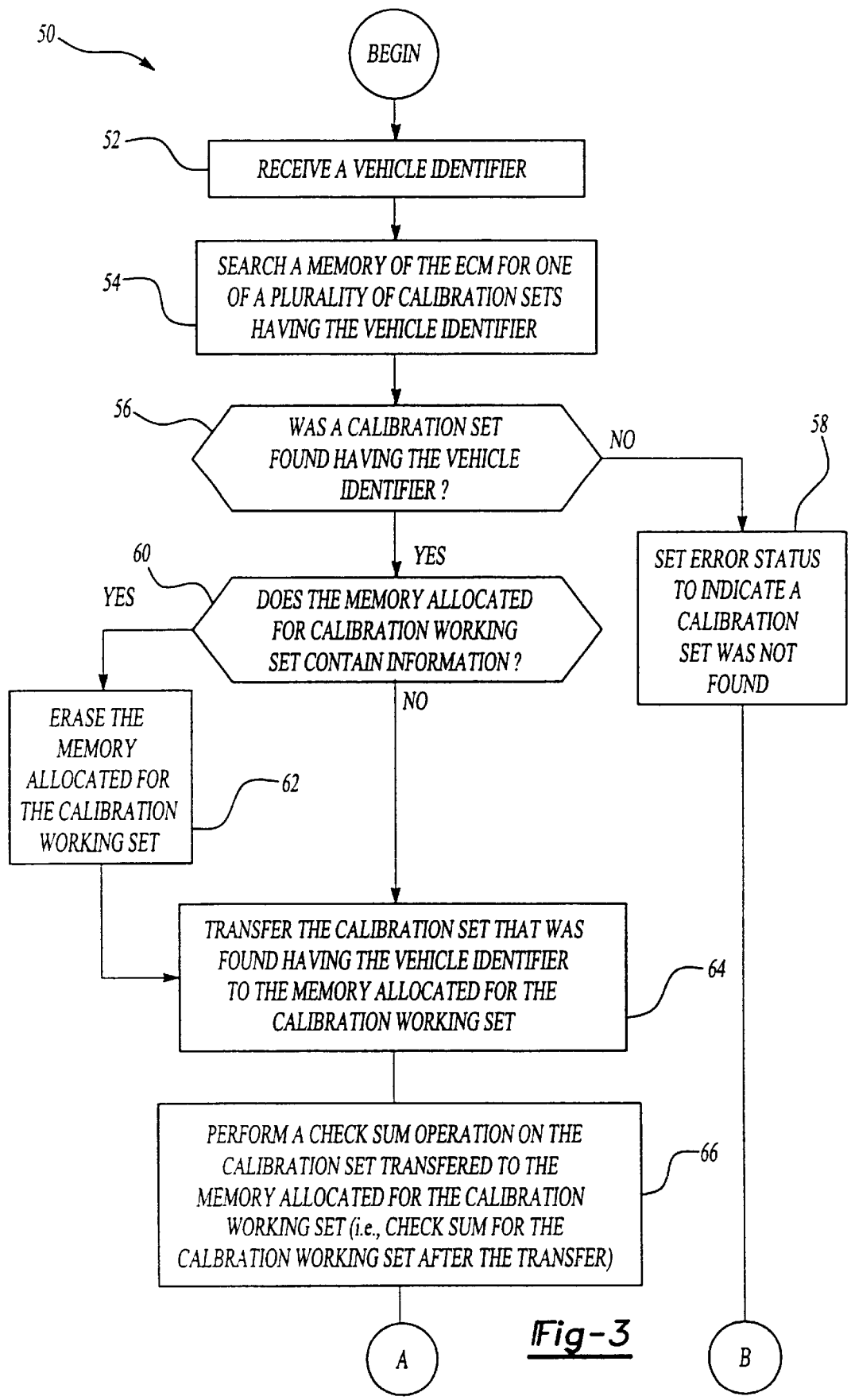

METHODS AND APPARATUS FOR CONFIGURING AN AUTOMOBILE ELECTRONIC CONTROL MODULE

TECHNICAL FIELD

The present invention generally relates to an electronic control module (ECM) of an automobile, and more particularly to methods and apparatus for configuring an ECM of an automobile for a specific automobile configuration.

BACKGROUND OF THE INVENTION

Automobile control functions have continued to transition from traditional mechanical and analog controls to an electronics- or microprocessor-based system of controls. For example, the operation of an automobile engine is generally controlled by a microprocessor-based engine electronic control module (ECM), which monitors a variety of input signals and generates output signals to control various components of the engine. The engine ECM can be configured to receive signals from various sensors located at the engine and drivetrain that are indicative of engine speed, fuel flow, air flow, intake pressure, throttle position, engine temperature, and the like. The engine ECM utilizes the sensor information to calculate various engine-operating parameters that are utilized to generate the output signals, which are provided as operational instructions to the engine components.

In addition to the sensor information, the ECM typically uses a collection of calibration data that customizes a generic engine ECM for a specific automobile configuration. For example, the calibration data customizes the generic ECM for variations such as engine size, vehicle dimensions, engine displacement, optional equipment, load factors, communication protocols, target market, and sensor types and positioning. The numerous variations result in a large number of calibration data sets that must be generated, configuration controlled, selected and downloaded to the ECM for proper operation of the ECM.

In order to provide the specific ECM configuration for any number of engine or automobile configurations, an ECM with a specific calibration data set is generally produced for each of the numerous variations and stored at the automobile assembly plant. Alternatively, an ECM is provided without calibration data and the specific calibration data set is downloaded to the ECM during the assembly process through a serial data link. As can be appreciated, these alternatives have undesirable consequences. For example, producing an ECM with a specific calibration data set for each of the various engine or automobile configurations results in a significant inventory of ECMs to support the assembly of an automobile that has numerous engine or automobile configurations and downloading the calibration set to an ECM during the assembly process increases the total production time.

In view of the foregoing, it should be appreciated that it would be desirable to provide methods and apparatus for configuring an automobile ECM that minimizes inventory requirements and reduces the total production time. Furthermore, additional desirable features will become apparent to one skilled in the art from the foregoing background of the invention and following detailed description of a preferred exemplary embodiment and appended claims.

SUMMARY OF THE INVENTION

In accordance with the teachings of the present invention, methods and apparatus are provided for configuring an automobile electronic control module (ECM) for multiple automobile configurations. The apparatus includes a vehicle identifier identifying one of the multiple automobile configurations and a memory configured to store multiple calibration data sets, with each of the multiple calibration sets corresponding to one of the multiple automobile configurations. The apparatus also includes a processor configured to receive the vehicle identifier and select one of multiple calibration data sets based at least in part upon the vehicle identifier for execution of automobile functions controlled by the automobile ECM.

BRIEF DESCRIPTION OF THE DRAWINGS

The present invention will hereinafter be described in conjunction with the appended drawing figures, wherein like numerals denote like elements, and:

FIG. 2 is an illustrative example of a calibration data set; and

FIGS. 3 and 4 are a flow chart illustrating the method of configuring an automobile ECM according to a preferred exemplary embodiment of the present invention.

DESCRIPTION OF THE PREFERRED EMBODIMENT

The following detailed description of a preferred exemplary embodiment of the invention is mainly exemplary in nature and is not intended to limit the invention or the application or use of the invention.

Figure 1:
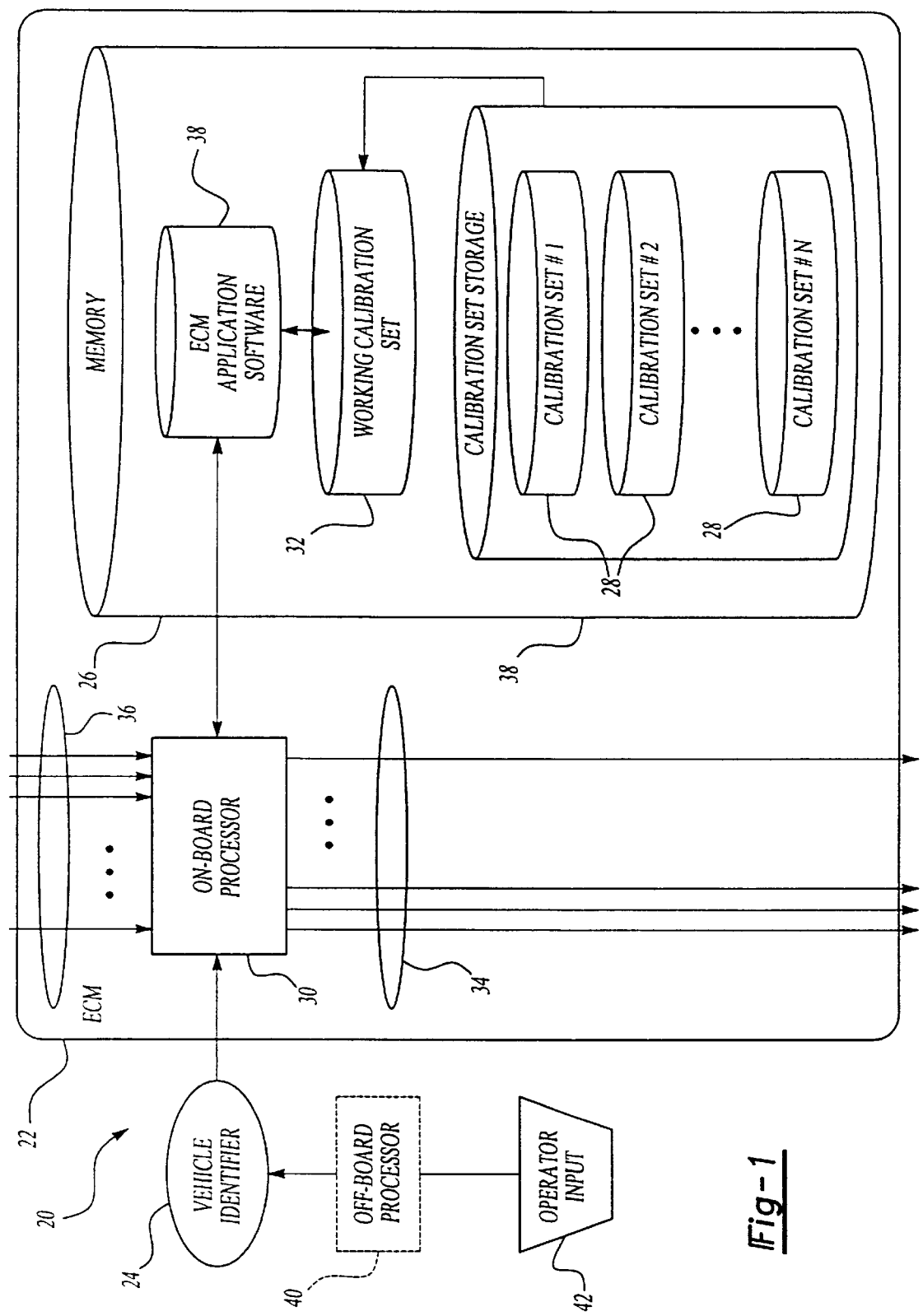
FIG. 1 is a simplified diagram of an apparatus for configuring an automobile electronic control module (ECM) according to a preferred exemplary embodiment of the present invention.

FIG. 1 is a simplified diagram of an apparatus 20 for configuring an automobile electronic control module (ECM) 22 according to a preferred exemplary embodiment of the present invention. The apparatus 20 includes, but is not limited to, a vehicle identifier 24 for identification of one of a plurality of automobile configurations, a memory 26 configured to store a plurality of calibration sets 28, which correspond to one of the plurality of automobile configurations, and a processor 30 configured to receive the vehicle identifier 24 and select one of the plurality of calibration sets 28 based at least in part upon the vehicle identifier 24. The one of the plurality of calibration sets 28 that is selected based at least in part upon the vehicle identifier is used by the ECM 22 as the working calibration set 32 to generate control signals 34 that are transmitted to the appropriate hardware controlled by the ECM 22 and/or used by another ECM as an input. While the foregoing background of the invention and following description of a preferred exemplary embodiment makes specific reference to an engine ECM or an engine electronic control unit (ECU), the principles discussed herein can be readily applied to other ECMs or ECUs of an automobile that use calibration data. For example, the principles discussed herein are readily applied to transmission ECMs, body ECMs, brake ECMs, and safety restraint ECMs, and the like.

The ECM 22 of the present invention is also configured to receive sensory inputs 36 from sensors and/or switches of the automobile that are indicative of the status of the automobile. For example, the sensory inputs 36 can be configured to provide engine speed, fuel flow, air flow, intake pressure, exhaust pressure, engine temperature, and the like to the ECM 22. The sensory inputs 36 are processed by the processor 30 according to instructions of ECM application software 38 in conjunction with calibration specifications stored as the working calibration set 32 to generate the appropriate control signals 34. While the ECM application software 38 provides the general instructions for processing the sensory inputs 34, the working calibration set 32 is provided to address the variations in the configuration of the automobile such as engine size, vehicle dimensions, engine displacement, existence of optional equipment, load factors, communication protocols, target market and sensor types and placements.

For example, and with reference to FIG. 2, a simplified and illustrative subset of a working calibration set 44 is shown for use by an engine ECM in the calculation of an engine spark angle control and subsequent generation of an engine spark angle control signal. The application software of the engine ECM is preferably configured to calculate a spark angle with sensory inputs of engine speed, engine temperature and throttle position using the working calibration set 44 that addresses variations in engine speed, engine temperature and throttle position due to the configuration of the automobile, such as engine displacement, preferred fuel octane, and emission level targets.

More specifically, and with emphasis that this description is a highly simplified and illustrative example and should not be used to limit the breadth or scope of the invention, the application software is configured to calculate the engine spark angle according to the following:

spark angle=Base_Spark_Angle f(engine_speed)+Temperature_Spark_Angle_Offset f(engine_temp)+Throttle_Spark_Angle_Offset f(throttle_position).

The sensory inputs of engine speed (i.e., engine_speed), engine temperature (i.e., engine_temp) and throttle position (i.e., throttle_position) are received by the ECM and the values for Base_Spark_Angle, Temperature_Spark_Angle_Offset and Throttle_Spark_Angle_Offset are obtained from the corresponding calibration table of the calibration working set 44. For example, if the sensory inputs indicated an engine speed of 2,500 revolutions per minute (RPM), engine temperature of 90° Celsius and a 60% throttle position, a spark angle control signal would be generated to command a ten-degree spark angle. However, the values for the Base Spark Angle, Temperature Spark Angle Offset and Throttle Spark Angle Offset change for a specific value of engine speed, engine temperature and throttle position, respectively, with the various automobile configurations. Therefore, a calibration set for the specific automobile configuration under the control of the ECM is selected as the working calibration data set.

Referring to FIG. 1, the working calibration set 32 is selected from one of the plurality of calibration sets 28 that corresponds to the automobile configuration in which the ECM has been installed for operation. The plurality of calibration sets are preferably stored in the memory 26 prior to installation of the ECM in the automobile during the automobile assembly process, preferably stored in dedicated memory for calibration set storage 38, and most preferably provide calibration for substantially all automobile configurations at a given automobile assembly location.

As previously alluded in this detailed description of a preferred exemplary embodiment, the selection of one of the calibration sets 28 for a particular automobile configuration is based at least in part upon the vehicle identifier 24. The vehicle identifier 24 can take any number of alphabetical, numerical or alphanumeric designations that distinguish between the automobile configurations. For example, the vehicle identifier can be a vehicle part number or specific values of the sensory inputs 36 from the sensors and/or switches of the automobile. In addition, the vehicle identifier 24 can be pre-stored in a memory of the automobile or provided to the processor 30 of the ECM 22 by an off-board computer 40 that receives operator input. The processor 30 of the ECM 22 utilizes the vehicle identifier 24 to select one of the plurality of calibration sets 28 as the working calibration 32 set such the ECM 22 is configured for one of the plurality of automobile configurations.

Figure 4:
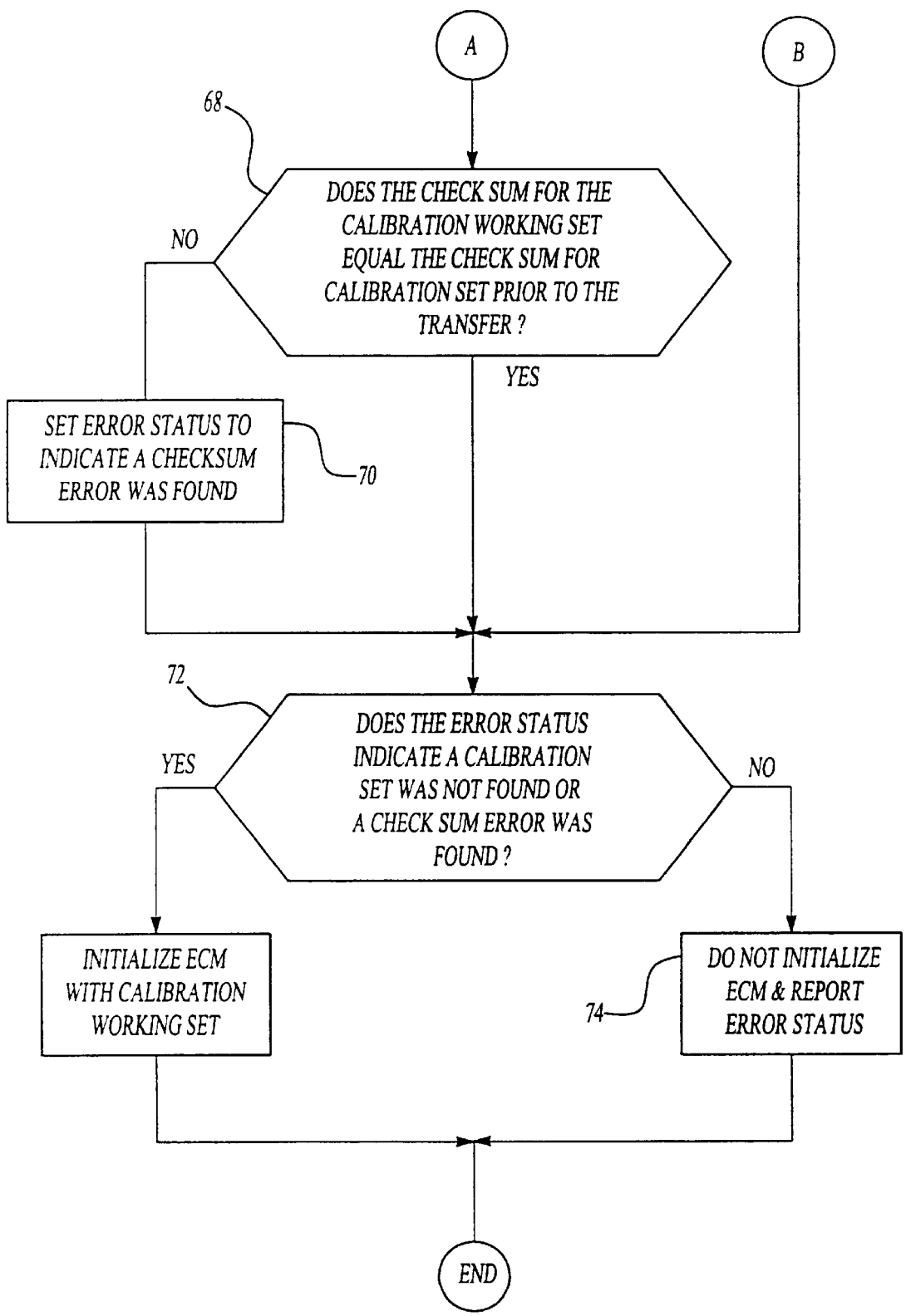

Referring to FIGS. 3 and 4, the method of configuring the ECM of FIG. 1 for one of a plurality of automobile configurations 50 is illustrated according to a preferred exemplary embodiment of the present invention. The method 50 begins by receiving the vehicle identifier 52. A search operation of the ECM memory is conducted for one of the plurality of calibration data sets that is associated with the vehicle identifier 54. Once the search of the memory for the vehicle identifier 54 is completed, a query is made to determine if a calibration set was found that is associated with the vehicle identifier 56. If a calibration set is not found that is associated with the vehicle identifier, an error status is set to indicate that a calibration set was not found in the memory search 58. Otherwise, the method 50 proceeds with the calibration set found in the search.

More specifically, the method determines whether the memory allocated for the calibration working set contains data 60. If data exists in the memory allocated for the calibration working set, a memory erase operation is conducted on this portion of memory 62. Once a determination is made that the memory allocated for the calibration working set does not contain data or the memory erase operation 62 is completed, the calibration set that was found with the associated vehicle identifier is transferred to the memory allocated for the calibration working data set 64. This transfer 64 is followed by a checksum operation on the memory allocated for the calibration working set with the transferred calibration set that was found with the associated vehicle identifier 66. The checksum of the transferred calibration set that was found with the associated vehicle identifier is compared to the checksum of this calibration set before the transfer 68, and an error status is set to indicate a checksum error exists if the two checksums are not equal 70.

Once the checksum query 68 and any associated error status action 70 is performed, a query is conducted to determine whether the error status indicates a calibration set was not found or a checksum error exists 72. In the event that the error status indicates that one of these error conditions exists, the ECM is not initialized with the calibration data set with the associated vehicle configured as the working calibration data set and an error status message is generated 74 by the method 50. Otherwise, the ECM is initialized with the calibration data set with the associated vehicle identifier configured as the working calibration data set 76, thereby configuring the ECM to utilize the calibration data working set in generating control signals for execution of automobile functions controlled by the ECM.

The foregoing detailed description provides a preferred exemplary embodiment only and is not intended to limit the scope, applicability, or configuration of the invention in any way. Rather, the ensuing detailed description will provide those skilled in the art with a convenient road map for implementing a preferred embodiment of the invention, it being understood that various changes may be made in the function and arrangement of elements described in an exemplary preferred embodiment without departing from the spirit and scope of the invention as set forth in the appended claims.

What is claimed is:

1. A method for configuring an electronic control module (ECM) for one of a plurality of configurations of an automobile, comprising:

receiving a vehicle identifier that identifies one of said plurality of configurations of the automobile;

searching a memory of said ECM for one of a plurality of calibration sets having said vehicle identifier, each of said plurality of calibration sets corresponding to one of said plurality of configurations of the automobile;

selecting said one of said plurality of calibration sets having said vehicle identifier as a calibration working set;

configuring said ECM to utilize said calibration working set in generating control signals for execution of automobile functions controlled by the ECM;

transferring said calibration working set to a dedicated memory for said calibration working set;

comparing a first checksum to a second checksum of said dedicated memory after said transferring said calibration working set to said dedicated memory; and generating an error status if said first checksum is not equal to said second checksum.

2. An apparatus for configuring an electronic control module (ECM) for one of a plurality of engine control configurations of an automobile, comprising:

a vehicle identifier identifying one of said plurality of engine control configurations of the automobile, said engine control configurations including engine spark angle control signals;

a memory configured to store said plurality of engine control calibration sets, each of said plurality of engine control calibration sets corresponding to one of said plurality of engine control configurations of the automobile; and a processor configured to receive said vehicle identifier and select one of said plurality of engine control calibration sets based at least in part upon said vehicle identifier, said processor configured to utilize said one of said plurality of engine control calibration sets in generating control signals for execution of automobile functions controlled by the ECM.

3. The apparatus of claim 2, wherein said processor is configured to receive a sensory input indicative of a status of the automobile and process said sensory input according to instructions of ECM application software and said one of said plurality of calibration sets.

4. The apparatus of claim 2, wherein said plurality of calibration sets are stored in said memory prior to installation of the ECM in the automobile.

5. The apparatus of claim 4, wherein said memory is a dedicated memory for calibration set storage.

6. A method for configuring an electronic control module (ECM) for one of a plurality of configurations of an automobile, comprising:

receiving a vehicle identifier that identifies one of said plurality of configurations of the automobile;

searching a memory of said ECM for one of a plurality of engine control calibration sets having said vehicle identifier, each of said plurality of engine control calibration sets corresponding to one of said plurality of configurations of the automobile;

selecting said one of said plurality of engine control calibration sets having said vehicle identifier as a calibration working set;

configuring said ECM to utilize said engine control calibration working set in generating control signals for execution of automobile functions controlled by the ECM; and controlling engine spark according to one of said plurality of engine control calibration sets.

7. The method of claim 6, wherein configuring said ECM to utilize said calibration working set comprises configuring a processor of said ECM to receive a sensory input indicative of a status of the automobile and process said sensory input according to instructions of application software of said ECM and said working calibration set.

8. The method of claim 6, further comprising generating an error status if searching said memory of said ECM for one of a plurality of calibration sets fails to identify one of said plurality of calibration sets having said vehicle identifier.

9. An apparatus for configuring an electronic control module (ECM) for one of a plurality of configurations of an automobile, comprising:

a vehicle part number identifying one of said plurality of configurations of the automobile;

a memory configured to store a plurality of engine control calibration sets corresponding to one of said plurality of configurations of the automobile, said engine control configurations including engine spark angle control signals, and said memory further configured to have each of said plurality of engine control calibration sets stored in said memory prior to installation of the ECM in the automobile; and a processor configured to receive said vehicle part number and select one of said plurality of engine control calibration sets based at least in part upon said vehicle part number, said processor further configured to receive a sensory input indicative of a status of the automobile and process said sensory input according to instructions of ECM application software and said one of said plurality of engine control calibration sets.

* * * * *